US008390554B2

(12) United States Patent
Cho et al.

(10) Patent No.: US 8,390,554 B2

(45) Date of Patent: Mar. 5, 2013

(54) LIQUID CRYSTAL DISPLAY DEVICE WITH GAMMA VOLTAGE ADJUSTING UNIT AND DRIVING METHOD THEREOF FOR ADJUSTING THE POTENTIALS OF THE GAMMA REFERENCE VOLTAGES DURING A HORIZONTAL BLANKING PERIOD

(75) Inventors: Changhun Cho, Kyungbuk (KR); Jinsung Kim, Kyungbuk (KR); Hyunchul Kim, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 698 days.

(21) Appl. No.: 12/580,593

(22) Filed: Oct. 16, 2009

(65) Prior Publication Data

US 2010/0277494 A1 Nov. 4, 2010

(30) Foreign Application Priority Data

Apr. 30, 2009 (KR) ........................ 10-2009-0038381

(51) Int. Cl.
*G06F 3/038* (2006.01)
*G09G 5/00* (2006.01)
*G09G 3/36* (2006.01)

(52) U.S. Cl. ............................................ 345/96; 345/98

(58) Field of Classification Search .................. 345/209, 345/87–104

See application file for complete search history.

(56) References Cited

U.S. PATENT DOCUMENTS

| | | | | |
|---|---|---|---|---|
| 7,817,123 | B2 * | 10/2010 | Do et al. | 345/87 |
| 2003/0132906 | A1 * | 7/2003 | Tanaka et al. | 345/89 |
| 2004/0263466 | A1 * | 12/2004 | Song et al. | 345/100 |
| 2006/0152462 | A1 * | 7/2006 | Furihata et al. | 345/98 |
| 2007/0001964 | A1 * | 1/2007 | Lee et al. | 345/96 |
| 2008/0143754 | A1 * | 6/2008 | Lee | 345/690 |
| 2008/0198123 | A1 | 8/2008 | Moon et al. | |
| 2008/0252632 | A1 * | 10/2008 | Im et al. | 345/209 |

FOREIGN PATENT DOCUMENTS

| | | | |
|---|---|---|---|
| JP | 200284737 A | | 3/2003 |
| KR | 10-20040059064 | * | 7/2004 |

OTHER PUBLICATIONS

Japanese Office Action (Application No. 2009-263506, dated May 14, 2012.

* cited by examiner

*Primary Examiner* — Chang Nguyen
*Assistant Examiner* — Navin Lingaraju
(74) *Attorney, Agent, or Firm* — Morgan, Lewis & Bockius LLP

(57) ABSTRACT

A liquid crystal display device and a method of driving the same are disclosed. The liquid crystal display device includes a liquid crystal display panel including data lines, gate lines crossing the data lines, and liquid crystal cells arranged in a matrix format at each of crossings of the data lines and the gate lines; a data drive circuit that converts digital video data into a positive/negative data voltage using gamma reference voltages to supply the positive/negative data voltage to the data lines; and a gamma voltage adjusting unit that increases a potential of each of the gamma reference voltages during a blanking period when a polarity of the positive/negative data voltage is inverted.

10 Claims, 13 Drawing Sheets

FIG. 3

| CT_1 | CT_2 | GMA0 |
|---|---|---|
| 0 | 0 | GMA−α (Weak charge) |
| 0 | 1 | GMA |
| 1 | 0 | X |
| 1 | 1 | GMA+α (Strong charge) |

LIQUID CRYSTAL DISPLAY DEVICE WITH GAMMA VOLTAGE ADJUSTING UNIT AND DRIVING METHOD THEREOF FOR ADJUSTING THE POTENTIALS OF THE GAMMA REFERENCE VOLTAGES DURING A HORIZONTAL BLANKING PERIOD

This application claims the benefit of Korea Patent Application No. 10-2009-0038381 filed on Apr. 30, 2009, the entire contents of which is incorporated herein by reference for all purposes as if fully set forth herein.

BACKGROUND OF THE INVENTION

1. Field of the Invention

Embodiments of the invention relate to a liquid crystal display device and a method of driving the same.

2. Discussion of the Related Art

Active matrix type liquid crystal display devices display a moving picture using a thin film transistor (TFT) as a switching element. The active matrix type liquid crystal display devices have been implemented in televisions as well as display devices in portable devices, such as office equipment and computers, because of the thin profile of an active matrix type liquid crystal display devices. Accordingly, cathode ray tubes (CRT) are being rapidly replaced by active matrix type liquid crystal display devices.

The liquid crystal display device has been driven in an inversion in which polarities of neighboring liquid crystal cells are opposite to each other and polarities of the neighboring liquid crystal cells are inverted every 1 frame period, so as to reduce direct current (DC) offset components and to reduce the degradation of liquid crystals.

FIG. 1 is a waveform diagram illustrating a driving manner in which a polarity of a data voltage is inverted every 2 horizontal periods. The driving manner is referred to as a 2-dot inversion. In the 2-dot inversion, a luminance difference between display lines or a color distortion may be generated, because there is a difference between data charge amounts of neighboring liquid crystal cells even if gray levels of successive data are equal to one another. In FIG. 1, a data charge amount of a liquid crystal cell charged to a data voltage of a polarity opposite a polarity of a previous data voltage is less than a data charge amount of a liquid crystal cell charged to a data voltage of the same polarity as the previous data voltage. To compensate for a difference between the data charge amounts depending on the polarity, a method for adjusting ng a source output enable signal SOE controlling output timing of source drive integrated circuits (ICs) every 1 horizontal period may be considered. However, in the method, because a data charge amount of a strong charge liquid crystal cell is reduced based on a weak charge liquid crystal cell, a luminance loss is caused.

SUMMARY OF THE INVENTION

Embodiments of the invention provide a liquid crystal display device and a method of driving the same capable of improving display quality by uniformizing data charge amounts of liquid crystal cells in an N-dot inversion, where N is an integer equal to or greater than 2.

In one aspect, there is a liquid crystal display device comprising a liquid crystal display panel including data lines, gate lines crossing the data lines, and liquid crystal cells arranged in a matrix format at each of crossings of the data lines and the gate lines; a data drive circuit that converts digital video data into a positive/negative data voltage using gamma reference voltages to supply the positive/negative data voltage to the data lines; and a gamma voltage adjusting unit that increases a potential of each of the gamma reference voltages during a blanking period when a polarity of the positive/negative data voltage is inverted.

The gamma voltage adjusting unit reduces the potential of each of the gamma reference voltages during a blanking period between the successively generated data voltages of the same polarity.

The liquid crystal display device further comprises a gate drive circuit that supplies a gate pulse to the gate lines and a timing controller that supplies the digital video data to the data drive circuit and controls the data drive circuit, the gate drive circuit, and the gamma voltage adjusting unit.

The gamma voltage adjusting unit includes a gamma voltage generating circuit that generates normal gamma reference voltages, a gamma voltage control circuit that outputs first and second gamma voltage control signals under the control of the timing controller, and a gamma voltage adjusting circuit that adjusts an absolute potential of each of the normal gamma reference voltages in response to the first and second gamma voltage control signals to generate the gamma reference voltages to be supplied to the data drive circuit.

The timing controller supplies a first internal signal, whose a logic level is inverted every about 1 horizontal period, and a second internal signal including pulses generated every about 1 horizontal period to the gamma voltage control circuit. The first internal signal and the second internal signal have a phase difference corresponding to a predetermined time interval.

The gamma voltage control circuit includes an AND gate that generates an AND output of the first and second internal signals, an exclusive OR (EOR) gate that generates an exclusive OR output of the first and second internal signals, and a plurality of flip-flops that delays the AND output of the AND gate and the exclusive OR output of the EOR gate to output the first and second gamma voltage control signals.

The gamma voltage adjusting circuit includes a plurality of operational amplifiers that selectively adjusts the absolute potential of each of the normal gamma reference voltages according to the first and second gamma voltage control signals.

In another aspect, there is a method of driving a liquid crystal display device comprising converting digital video data into a positive/negative data voltage using gamma reference voltages to supply the positive/negative data voltage to data lines of a liquid crystal display panel and increasing a potential of each of the gamma reference voltages during a blanking period when a polarity of the positive/negative data voltage is inverted.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 illustrates adjustment conditions of a gamma reference voltage;

DETAILED DESCRIPTION OF THE EMBODIMENTS

Reference will now be made in detail embodiments of the invention examples of which are illustrated in the accompanying drawings.

Figure 1:
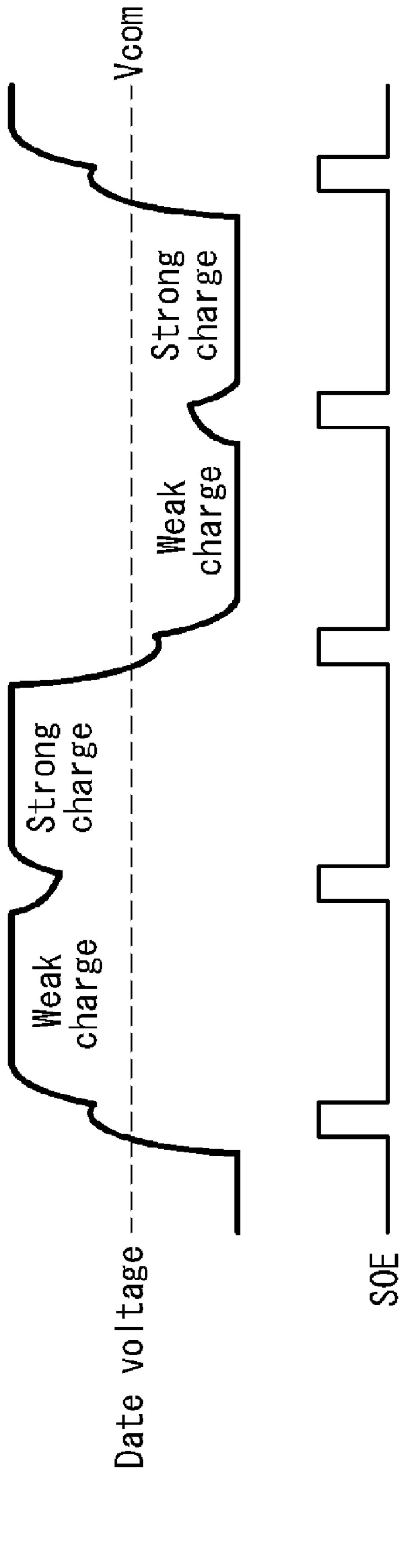
FIG. 1 (Related Art)
FIG. 1 is a waveform diagram illustrating non-uniformity in a charge amount of a data voltage in a 2-dot inversion.
Figure 2:
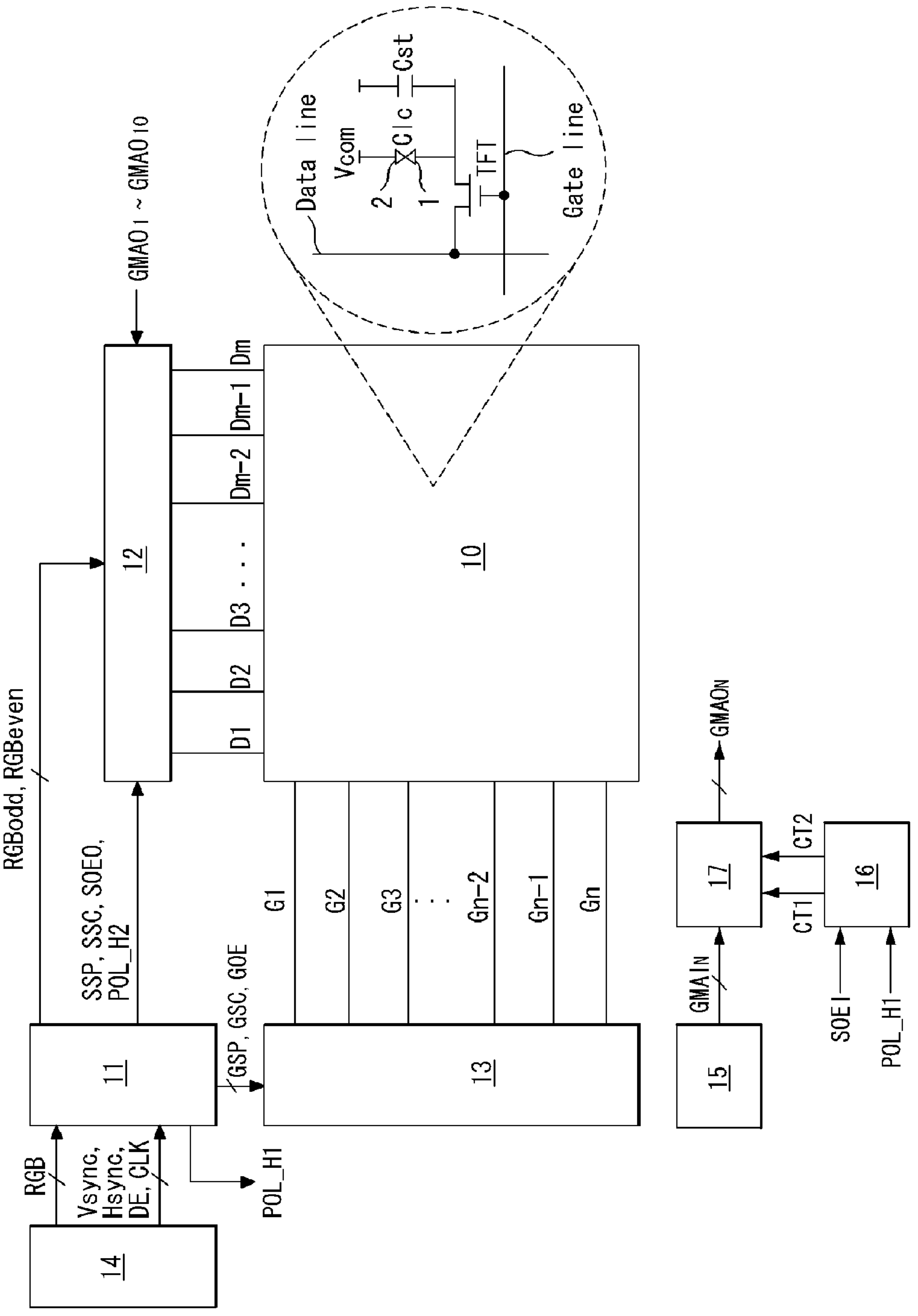
FIG. 2 is a block diagram illustrating a liquid crystal display device according to an embodiment of the invention.

As shown in FIG. 2, a liquid crystal display device according to an embodiment of the invention includes a liquid crystal display panel 10, a data drive circuit 12 connected to data lines D1 to Dm of the liquid crystal display panel 10, a gate drive circuit 13 connected to gate lines G1 to Gn of the liquid crystal display panel 10, a timing controller 11 controlling the data drive circuit 12 and the gate drive circuit 13, and a gamma voltage adjusting unit for selectively adjusting gamma reference voltages GMAO1 to GMAO5 and GMAO6 to GMAO10 supplied to the data drive circuit 12. The gamma voltage adjusting unit includes a gamma voltage generating circuit 15 generating an internal gamma reference voltage $GMAI_N$ and a gamma voltage control circuit 16 and a gamma voltage adjusting circuit 17 for adjusting the internal gamma reference voltage $GMAI_N$.

The liquid crystal display panel 10 includes an upper glass substrate and a lower glass substrate with a liquid crystal layer interposed between the upper and lower glass substrates. The liquid crystal display panel 10 includes a pixel array displaying video data. The pixel array may be implemented as a thin film transistor (TFT) array shown in FIG. 4 or 5. In case of the TFT array shown in FIG. 4 having a resolution of (m/3)×n, the TFT array shown in FIG. 4 includes m×n liquid crystal cells arranged in a matrix format according to a crossing structure of m data lines D1 to Dm and n gate lines G1 to Gn. One pixel in the TFT array of FIG. 4 includes R, G, and B subpixels, and liquid crystal cells of the R, G, and B subpixels are connected to different data lines through TFTs. In the TFT array of FIG. 4, the TFTs in each of display lines are turned on or off according to a scan pulse (or a gate pulse) supplied through one gate line.

Figure 4:
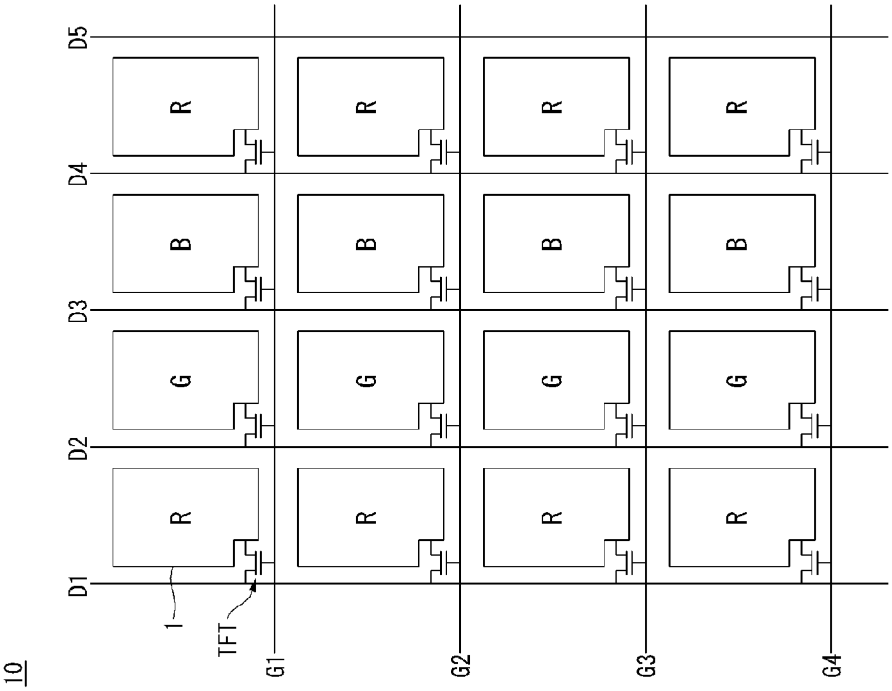
FIG. 4 is an equivalent circuit diagram illustrating an example of a thin film transistor (TFT) array.
Figure 5:
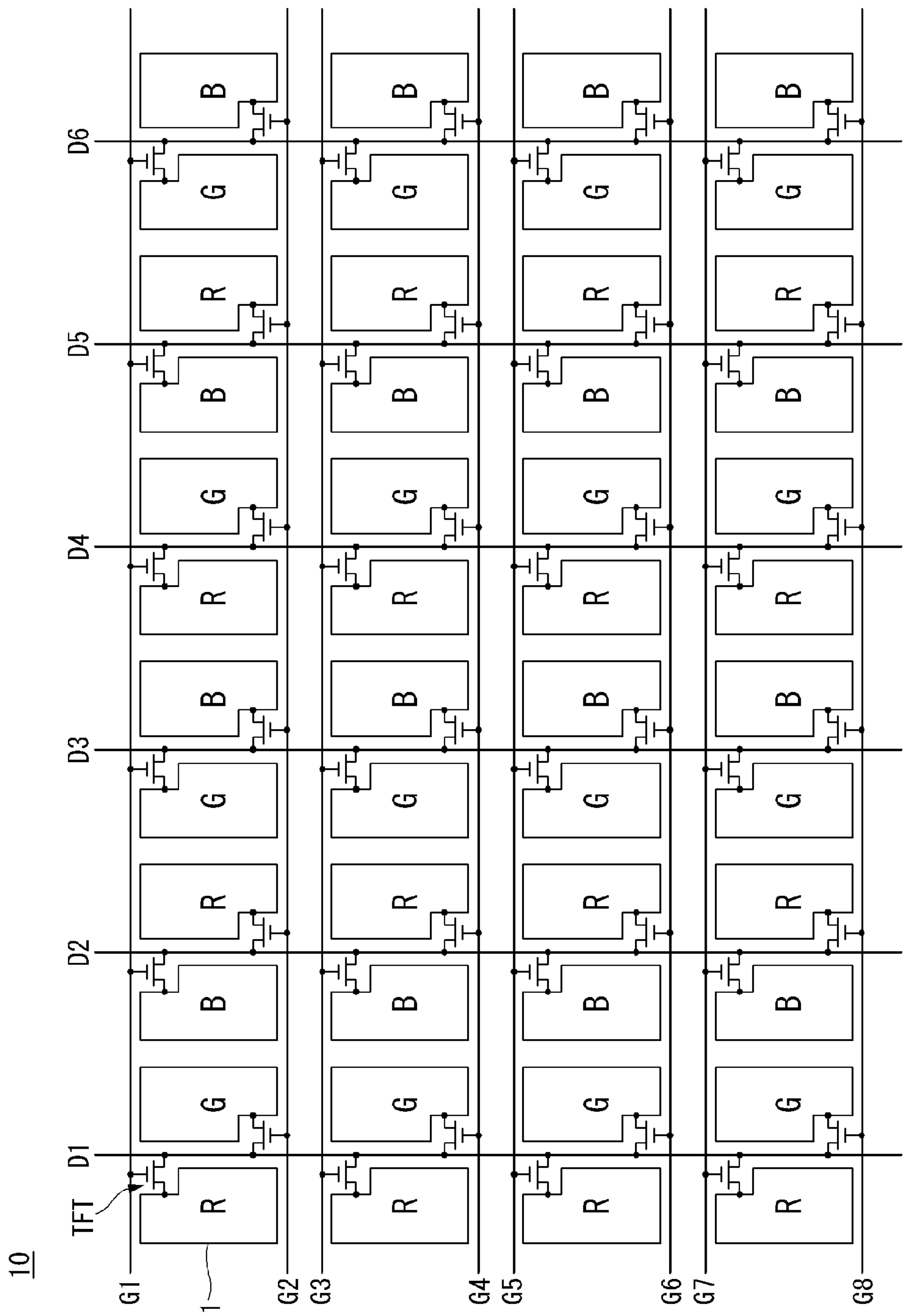
FIG. 5 is an equivalent circuit diagram illustrating another example of a TFT array.

In case of the TFT array shown in FIG. 5 having a resolution of (m/3)×n, the TFT array shown in FIG. 5 includes m×n liquid crystal cells arranged in a matrix format according to a crossing structure of m/2 data lines D1 to Dm/2 and 2n gate lines G1 to G2*n*. One pixel in the TFT array of FIG. 5 includes R, G, and B subpixels. One data line is shared with adjacent subpixels. In the TFT array of FIG. 5, the TFTs in each of display lines are connected to a pair of gate lines in a zigzag structure and are turned on or off according to a scan pulse received from one gate line of the pair of gate lines. Accordingly, supposing that the TFT array of FIG. 5 has the same resolution as the TFT array of FIG. 4, the number of data lines in the TFT array of FIG. 5 is reduced to one half of the number of data lines in the TFT array of FIG. 4, and the number of gate lines in the TFT array of FIG. 5 increases by two times the number of gate lines in the TFT array of FIG. 4. Further, the number of output channels of the data drive circuit in the TFT array of FIG. 5 is reduced to one half of that in the TFT array of FIG. 4.

The TFT arrays of FIGS. 4 and 5 are formed on the lower glass substrate of the liquid crystal display panel 10. Each of the TFT arrays of FIGS. 4 and 5 includes the data lines, the gate lines, the pixel electrodes 1, the TFTs connected to the pixel electrodes 1, and storage capacitors connected to the pixel electrodes 1. Liquid crystal cells in the TFT arrays of FIGS. 4 and 5 are connected to the TFTs, and an image is displayed according to video data by adjusting a transmittance of light using an electric field between the pixel electrode 1 and a common electrode 2.

A black matrix, a color filter, and a common electrode 2 are formed on the upper glass substrate of the liquid crystal display panel 10. The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode.

Polarizing plates are attached respectively to the upper and lower glass substrates of the liquid crystal display panel 10. Alignment layers for setting a pre-tilt angle of the liquid crystals are respectively formed on the upper and lower glass substrates.

A liquid crystal mode of the liquid crystal display panel 10 applicable to the embodiment of the invention may be implemented in any liquid crystal mode as well as the TN, VA, IPS, and FFS modes. The liquid crystal display device according to the embodiment of the invention may be implemented in any type liquid crystal display device including a backlit liquid crystal display device, a transflective liquid crystal display device, and a reflective liquid crystal display device. A backlight unit is necessary in the backlit liquid crystal display device and the transflective liquid crystal display device. The backlight unit may be implemented as an edge type backlight unit or a direct type backlight unit. In the edge type backlight unit, a plurality of light sources are positioned opposite the side of a light guide plate, and a plurality of optical sheets are positioned between the liquid crystal display panel and the light guide plate. In the direct type backlight unit, a plurality of optical sheets and a diffusion plate are stacked under the liquid crystal display panel, and a plurality of light sources are positioned under the diffusion plate. The light source of the backlight unit may use one or at least two of a hot cathode fluorescent lamp (HCFL), a cold cathode fluorescent lamp (CCFL), an external electrode fluorescent lamp (EEFL), and a light emitting diode (LED).

Figure 6:
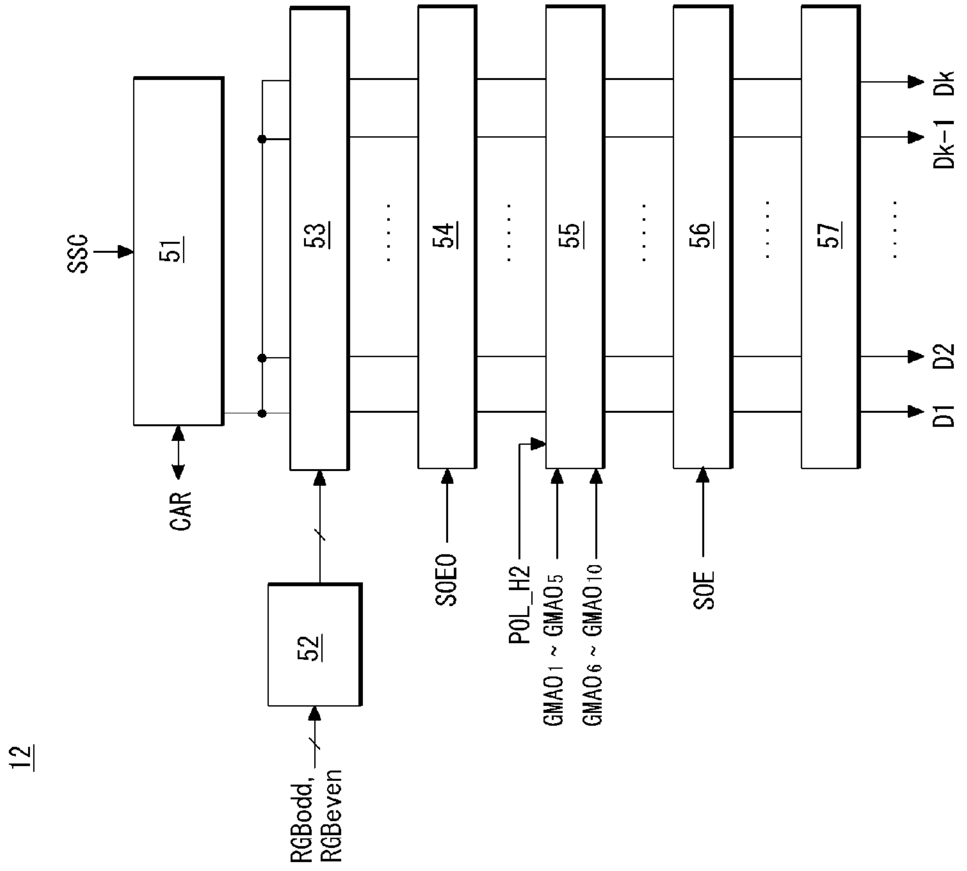
FIG. 6 is a block diagram illustrating a circuit configuration of a data drive circuit.

The data drive circuit 12 includes a plurality of source drive integrated circuits (ICs) having a circuit configuration illustrated in FIG. 6. Each of the source driver ICs samples and latches digital video data RGBodd and RGBeven input from the timing controller 11 in response to data timing control signals SSP, SSC, and SOEO and a polarity control signal POL_H2 received from the timing controller 11 to convert the digital video data RGBodd and RGBeven into parallel data.

Each of the source driver ICs converts the deserialized digital video data into an analog gamma compensation voltage using gamma reference voltages $GMAO_N$ input from the gamma voltage adjusting circuit 17 to generate a positive or negative analog video data voltage to which the liquid crystal cells will be charged. Each of the source driver ICs inverts a polarity of the positive/negative analog video data voltage every N horizontal periods (where N is an integer equal to or greater than 2) in response to the polarity control signal POL_H2 to supply the positive/negative analog video data voltage to the data lines D1 to Dm.

The gate drive circuit 13 includes a plurality of gate driver ICs. The gate drive circuit 13 includes a shift register sequentially shifting a gate driving voltage in response to gate timing control signals GSP, GSC, and GOE received from the timing controller 11 to sequentially supply a gate pulse (or a scan pulse) to the gate lines G1 to Gn.

The timing controller 11 receives RGB digital video data and timing signals, such as a vertical sync signal Vsync, a horizontal sync signal Hsync, a data enable signal DE, and a dot clock CLK, from a system board 14 through an interface, such as a low voltage differential signaling (LVDS) interface and a transition minimized differential signaling (TMDS) interface. The timing controller 11 transmits the RGB digital video data to the source driver ICs of the data drive circuit 12 in a mini LVDS interface manner. The timing controller 11 generates a data timing control signal and a polarity control signal for controlling operation timing of the data drive circuit 12 and a gate timing control signal for controlling operation timing of the gate drive circuit 13 using the timing signals Vsync, Hsync, DE, and CLK. The timing controller 11 may multiply a frequency of each of the data timing control signal and the gate timing control signal based on a frame frequency of (60×i) Hz (where "i" is a positive integer), so that digital video data input at a frame frequency of 60 Hz can be reproduced in the pixel array of the liquid crystal display panel 10 at the frame frequency of (60×i) Hz. The timing controller 11 generates control signals for controlling a signal output from the gamma voltage control circuit 16. The control signals include an internal polarity control signal POL_H1 whose a logic level is inverted every 1 horizontal period, an internal source output enable signal SOEI whose a pulse is generated every 1 horizontal period, and the like. The internal polarity control signal POL_H1 and the internal source output enable signal SOEI are substantially equal to a polarity control signal inverting a polarity of the data voltage output from the data drive circuit 12 every 1 horizontal period and a source output enable signal outputting a charge share voltage or a common voltage Vcom every 1 horizontal period in an existing 1-dot inversion, respectively. Because the embodiment of the invention drives the liquid crystal display panel 10 in an N-dot inversion (where N is an integer equal to or greater than 2), the internal polarity control signal POL_H1 and the internal source output enable signal SOEI are not input to the data drive circuit 12.

The data timing control signal includes a source start pulse SSP, a source sampling clock SSC, a source output enable signal SOEO, and the like. The source start pulse SSP controls a start time point of a data sampling operation of the data drive circuit 12. If a signal transmission manner between the timing controller 11 and the data drive circuit 12 is the mini LVDS interface, the source start pulse SSP may be omitted. The source sampling clock SSC controls a data sampling operation inside the data drive circuit 12 based on a rising or falling edge. The polarity control signal POL_H2 inverts a polarity of the data voltage output from the data drive circuit 12 every N horizontal periods. The source output enable signal SOEO controls output timing of the data drive circuit 12. When the polarity of the data voltage supplied to the data lines D1 to Dm is inverted, the source output enable signal SOEO input to the source driver ICs of the data drive circuit 12 generates a high logic level pulse. Accordingly, the source output enable signal SOEO includes a pulse generated every N horizontal periods.

When the polarity of the data voltage supplied to the data lines D1 to Dm is inverted, each of the source driver ICs of the data drive circuit 12 supplies the charge share voltage or the common voltage Vcom to the data lines D1 to Dm in response to the pulse of the source output enable signal SOEO and supplies the data voltage to the data lines D1 to Dm during a low logic period of the source output enable signal SOEO. The charge share voltage is an average voltage of the neighboring data lines to which the data voltages each having a different polarity are supplied.

The gate timing control signal includes a gate start pulse GSP, a gate shift clock GSC, a gate output enable signal GOE, and the like. The gate start pulse GSP controls timing of a first gate pulse. The gate shift clock GSC is a clock for shifting the gate start pulse GSP. The gate output enable signal GOE controls output timing of the gate drive circuit 13.

Figure 9:
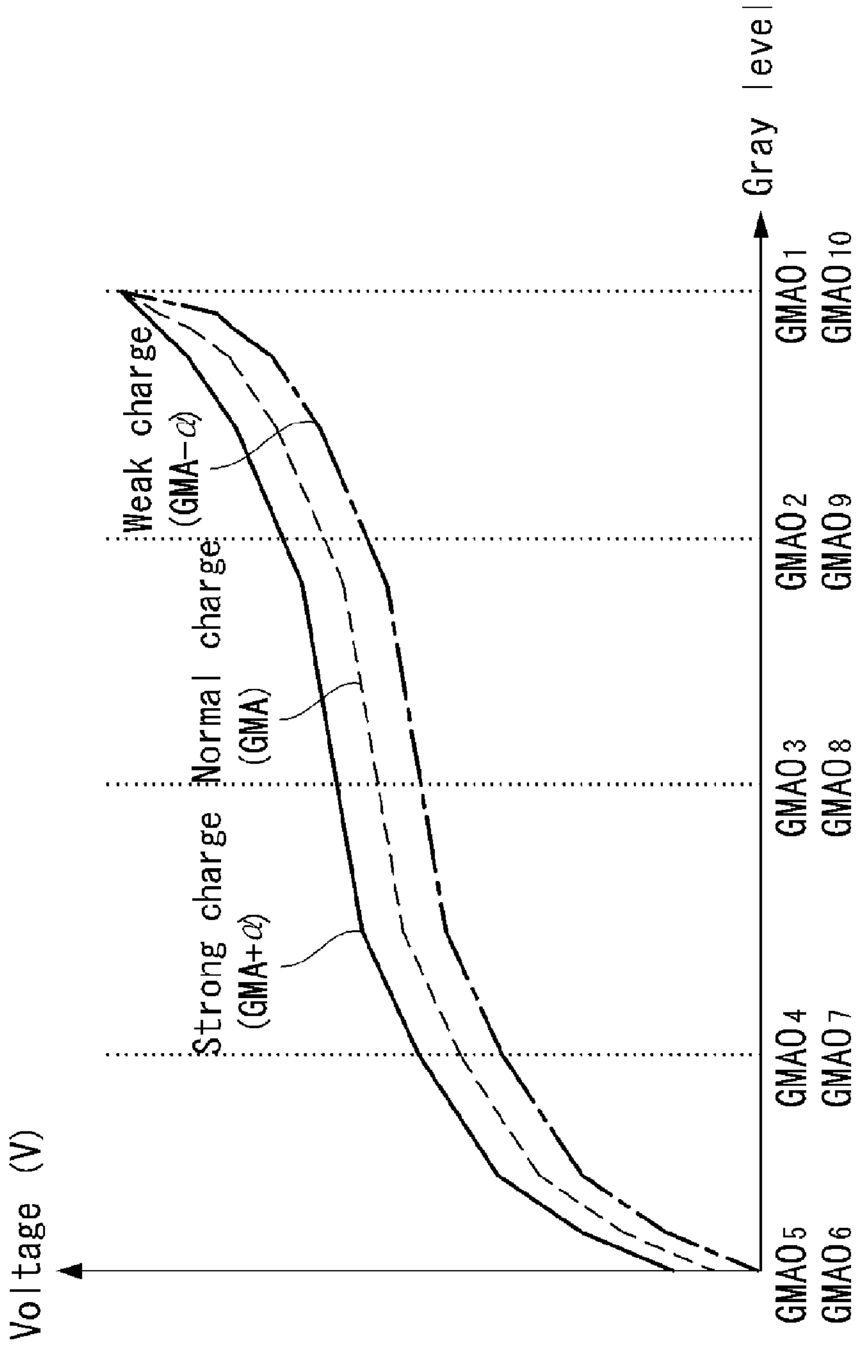
FIG. 9 is a waveform diagram illustrating an adjusting example of a gamma reference voltage in a liquid crystal display device according to an embodiment of the invention.

The gamma voltage generating circuit 15 divides a high potential power voltage VDD and a low potential power voltage VSS (or a ground level voltage GND) to generate internal positive gamma reference voltages GMAI1 to GMAI5 and internal negative gamma reference voltages GMAI6 to GMAI10. A voltage division circuit of the gamma voltage generating circuit 15 may be implemented as an R-string circuit, comprised of resistors connected in series to one another, between a supply terminal of the high potential power voltage VDD and a supply terminal of the ground level voltage GND. In the existing liquid crystal display device, the internal positive and negative gamma reference voltages GMAI1 to GMAI5 and GMAI6 to GMAI10 are supplied to the data drive circuit 12. On the contrary, in the embodiment of the invention, as shown in FIGS. 3 and 9, gamma reference voltages GMAO1 to GMAO5 and GMAO6 to GMAO10 obtained by selectively raising or lowering levels of the internal positive and negative gamma reference voltages GMAI1 to GMAI5 and GMAI6 to GMAI10 are supplied to the data drive circuit 12.

The gamma voltage control circuit 16 generates first and second gamma voltage control signals CT1 and CT2 each having a pulse generated every N horizontal periods. The first and second gamma voltage control signals CT1 and CT2 have a predetermined time difference according to the internal polarity control signal POL_H1 and the internal source output enable signal SOEI input from the timing controller 11. The gamma voltage control circuit 16 may be mounted inside the timing controller 11 and may be replaced with a logic circuit mounted inside the timing controller 11.

The gamma voltage adjusting circuit 17 adjusts the internal positive and negative gamma reference voltages GMAI1 to GMAI5 and GMAI6 to GMAI10 according to the first and second gamma voltage control signals CT1 and CT2 based on Table illustrated in FIG. 3 to generate the gamma reference voltages GMAO1 to GMAO5 and GMAO6 to GMAO10 to be supplied to the data drive circuit 12. As shown in FIG. 3, when the first and second gamma voltage control signals CT1 and CT2 are a high logic level, the gamma voltage adjusting circuit 17 increases absolute potentials GMA of the internal positive and negative gamma reference voltages GMAI1 to GMAI5 and GMAI6 to GMAI10 to GMA+α. On the other hand, when the first and second gamma voltage control signals CT1 and CT2 are a low logic level, the gamma voltage adjusting circuit 17 reduces the absolute potentials GMA of the internal positive and negative gamma reference voltages GMAI1 to GMAI5 and GMAI6 to GMAI10 to GMA-α. In addition, when the first gamma voltage control signal CT1 of a low logic level and the second gamma voltage control signal CT2 of a high logic level are generated, the gamma voltage adjusting circuit 17 does not adjust the absolute potentials GMA of the internal positive and negative gamma reference voltages GMAI1 to GMAI5 and GMAI6 to GMAI10 and supplies them to the data drive circuit 12.

FIG. 4 is an equivalent circuit diagram illustrating an example of the TFT array.

As shown in FIG. 4, liquid crystal columns between the data lines D1 to D5 are positioned in one row. Each of the data lines D1 to D5 is connected to the TFTs of different liquid crystal columns. Each of the gate lines G1 to G4 is connected to TFTs of different lines. The TFTs include source electrodes connected to the data lines D1 to D5, gate electrodes connected to the gate lines G1 to G4, and drain electrodes connected to the pixel electrode 1. In the liquid crystal display device to which the TFT array of FIG. 4 is applied, the liquid crystal cells positioned on the same line are charged to the data voltages simultaneously output from the data drive circuit 12.

FIG. 5 is an equivalent circuit diagram illustrating another example of the TFT array.

As shown in FIG. 5, liquid crystal columns between data lines D1 to D6 are positioned in two rows. Each of the data lines D1 to D6 is connected to TFTs of left liquid crystal columns and TFTs of right liquid crystal columns with each data line interposed between the left liquid crystal columns and the right liquid crystal columns. Gate lines G1 to G8 include odd-numbered gate lines G1, G3, G5 and G7 and even-numbered gate lines G2, G4, G6 and G8. The odd-numbered gate lines G1, G3, G5 and G7 are connected to TFTs of odd-numbered liquid crystal cells in each of lines of the liquid crystal display panel, and the even-numbered gate lines G2, G4, G6 and G8 are connected to TFTs of even-numbered liquid crystal cells in each of the lines of the liquid crystal display panel. The TFTs include source electrodes connected to the data lines D1 to D6, gate electrodes connected to the gate lines G1 to G8, and drain electrodes connected to the pixel electrode 1. The gate drive circuit 13 supplies an odd gate pulse synchronized with the data voltage charged to the odd-numbered liquid crystal cells to the odd-numbered gate lines G1, G3, G5 and G7 and supplies an even gate pulse synchronized with the data voltage charged to the even-numbered liquid crystal cells to the even-numbered gate lines G2, G4, G6 and G8. The data voltages time-divided by the data drive circuit 12 are supplied to the data lines D1 to D6. Accordingly, in the liquid crystal display device to which the TFT array of FIG. 5 is applied, the odd-numbered liquid crystal cells and the even-numbered liquid crystal cells on the same line are charged to the data voltages at a predetermined time interval.

FIG. 6 is a block diagram illustrating a circuit configuration of the source driver ICs of the data drive circuit 12.

As shown in FIG. 6, each of the source driver ICs drives k data lines, where k is a positive integer smaller than m. Each of the source driver ICs includes a shift register 51, a data restoring unit 52, a first latch array 53, a second latch array 54, a digital-to-analog converter (DAC) 55, a charge share circuit 56, and an output circuit 57.

Figure 11:
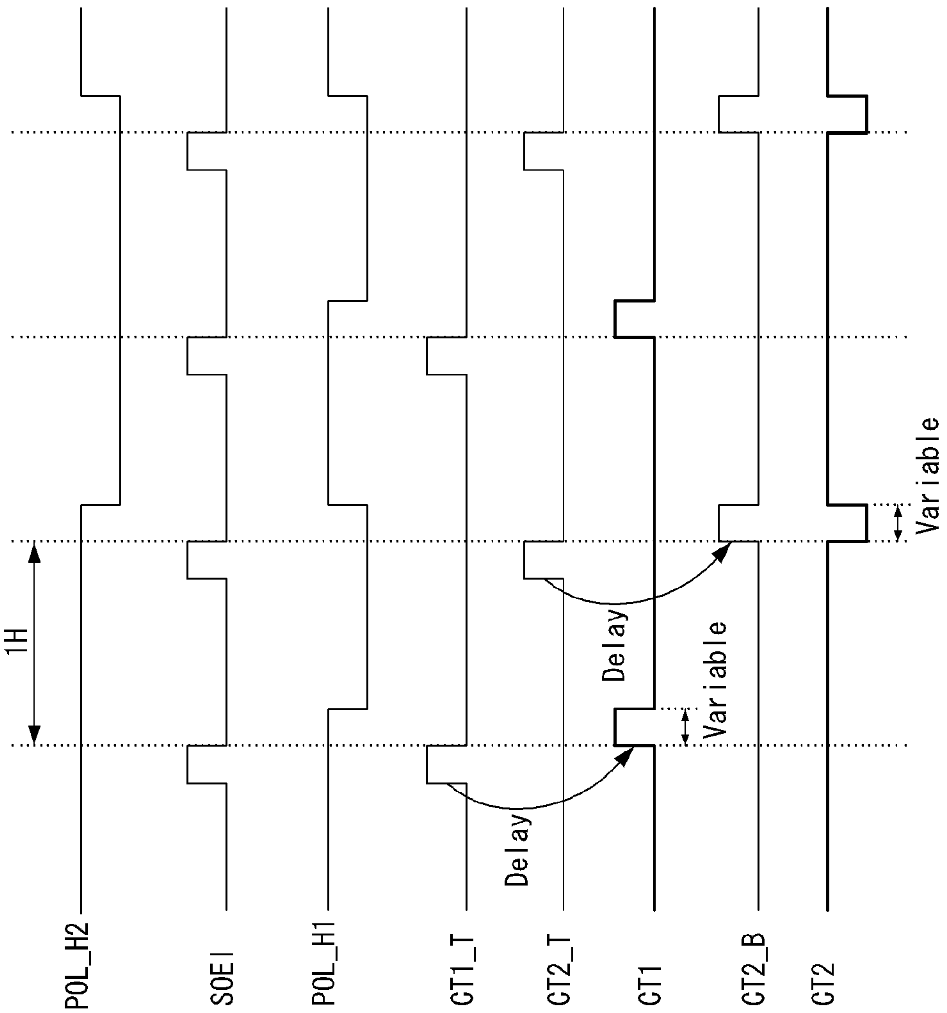
FIG. 11 is a waveform diagram illustrating input and output waveforms of a gamma voltage control circuit.

The data restoring unit 52 restores the digital video data RGBodd and RGBeven received from the timing controller 11 in the mini LVDS interface manner to supply the digital video data RGBodd and RGBeven to the first latch array 53. The shift register 51 shifts a sampling signal according to the source sampling clock SSC. When the first latch array 53 receives data exceeding the number of latch operations in the first latch array 53 from the data restoring unit 52, the shift register 51 generates a carry signal CAR. The first latch array 53 samples and latches the digital video data RGBodd and RGBeven from the data restoring unit 52 in response to the sampling signal sequentially received from the shift register 51 and then simultaneously outputs the digital video data RGBodd and RGBeven. The second latch array 54 latches the digital video data RGBodd and RGBeven received from the first latch array 53. Then, the second latch array 54 and the second latch arrays 54 of the other source driver ICs simultaneously output the latched digital video data RGBodd and RGBeven during a low logic period of the source output enable signal SOEO. The DAC 55 converts the digital video data received from the second latch array 54 into a positive analog data voltage and a negative analog data voltage using the positive gamma reference voltages GMAO1 to GMAO5 and the negative gamma reference voltages GMAO6 to GMAO10. Further, the DAC 55 outputs the data voltage, whose a polarity is inverted every N horizontal periods, in response to the polarity control signal POL_H2. For the above-described operation, the DAC 55 includes a P-decoder receiving the positive gamma reference voltages GMAO1 to GMAO5, an N-decoder receiving the negative gamma reference voltages GMAO6 to GMAO10, and a multiplexer selecting an output of the P-decoder and an output of the N-decoder in response to the polarity control signal POL_H2. In the 2-dot inversion, a logic level of the polarity control signal POL_H2, as shown in FIG. 11, is inverted every 2 horizontal periods. Accordingly, in the 2-dot inversion, each of the source driver ICs outputs the data voltage, whose a polarity is inverted every 2 horizontal periods. The charge share circuit 56 shorts neighboring data output channels to output an average value of the neighboring data voltages as a charge share voltage during a high logic period of the source output enable signal SOEO. Otherwise, during the high logic period of the source output enable signal SOEO, the charge share circuit 106 supplies the common voltage Vcom to the data output channels to reduce a change in a sharp swing width between the positive and negative data voltages to be supplied to the data lines D1 to Dm. The output circuit 57 minimizes a signal attenuation of the data voltage supplied to the data lines D1 to Dm using a buffer.

Figure 7:
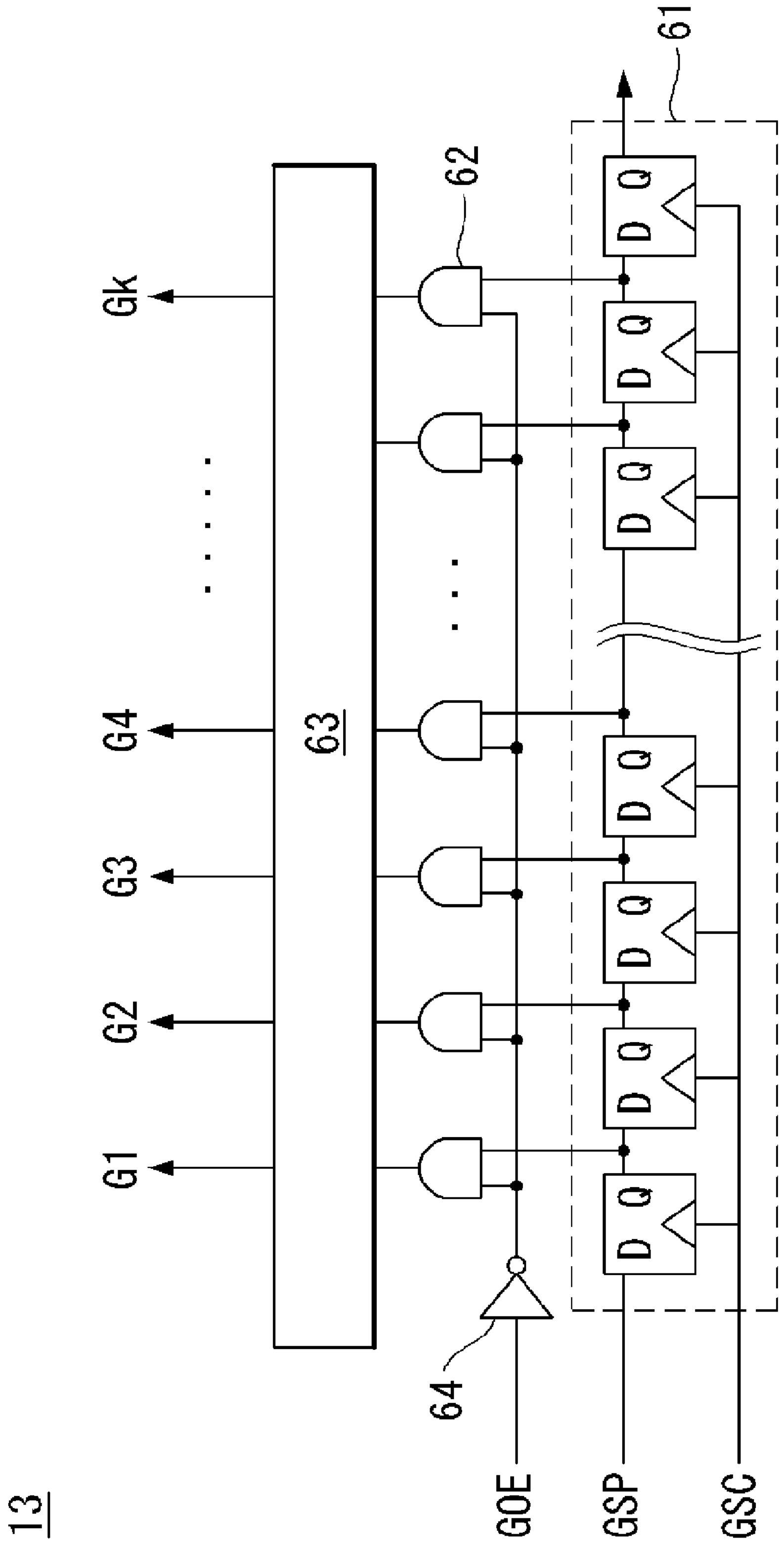
FIG. 7 is a block diagram illustrating a circuit configuration of a gate drive circuit.

FIG. 7 is a block diagram illustrating a circuit configuration of the gate driver ICs of the gate drive circuit 13.

As shown in FIG. 7, each of the gate driver ICs includes a shift register 61, a level shifter 63, a plurality of AND gates 62 connected between the shift register 61 and the level shifter 63, and an inverter 64 inverting the gate output enable signal GOE.

The shift register 61 sequentially shifts the gate start pulse GSP in response to the gate shift clock GSC using a plurality of cascade-connected D flip-flops. Each of the AND gates 62 performs AND operation on an output signal of the shift register 61 and an inversion signal of the gate output enable signal GOE to generate an output. The inverter 64 inverts the gate output enable signal GOE to supply the inverted gate output enable signal GOE to the AND gates 62. Accordingly, each of the gate driver ICs outputs a high logic voltage of the scan pulse during a low logic period of the gate output enable signal GOE. The level shifter 63 shifts a swing width of the output voltage of the AND gates 62 within the range of an operation voltage of the TFTs inside the pixel array of the liquid crystal display panel 10. An output signal of the level shifter 63 is sequentially supplied to the gate lines G1 to Gn.

The level shifter 63 may be positioned in the front of the shift register 61, and the shift register 61 and the TFTs of the pixel array may be directly positioned on the glass substrate of the liquid crystal display panel 10.

Figure 8:
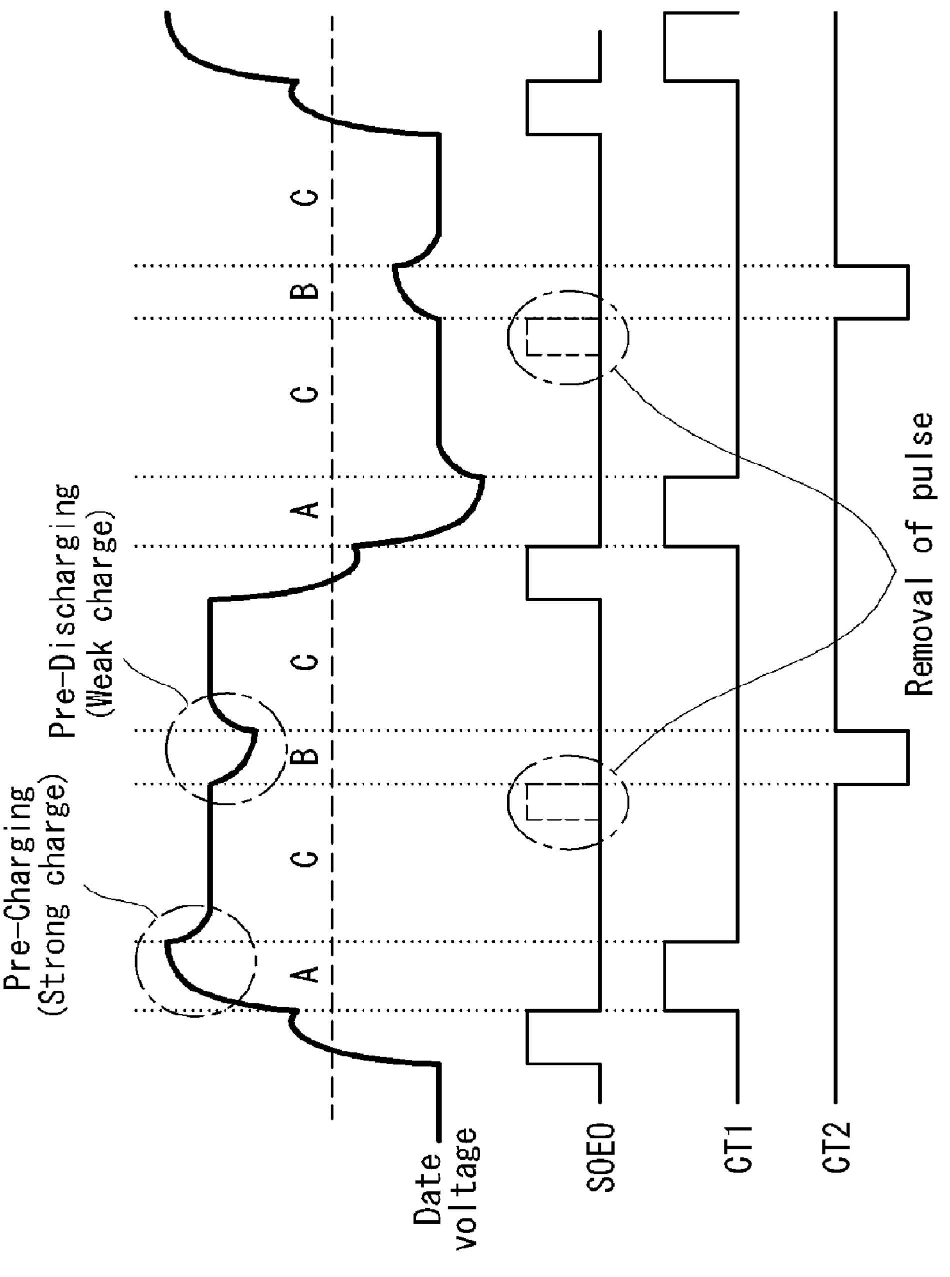
FIG. 8 illustrates an example of a data voltage charged to liquid crystal cells in a 2-dot inversion according to an embodiment of the invention.

FIG. 8 illustrates an example of the positive or negative data voltage output from the source driver ICs in the 2-dot inversion manner.

As shown in FIG. 8, in the 2-dot inversion, a pulse of the source output enable signal SOEO is generated every 2 horizontal periods. The source driver IC outputs the positive/negative data voltage during a low logic period of the source output enable signal SOEO. The source driver IC outputs the charge share voltage or the common voltage Vcom during a high logic period of the source output enable signal SOEO. Accordingly, the source driver IC supplies the positive data voltage (or the negative data voltage) to the data lines and then supplies the charge share voltage or the common voltage Vcom to the data lines during 2 horizontal periods. Subsequently, the source driver IC supplies the negative data voltage (or the positive data voltage) to the data lines during next 2 horizontal periods.

The absolute potentials of the gamma reference voltages GMAO1 to GMAO5 and GMAO6 to GMAO10 are selectively adjusted by the gamma voltage control circuit 16 and the gamma voltage adjusting circuit 17. During a period "A" when a polarity of the data voltage is inverted, as shown in FIGS. 3 and 8, the first and second gamma voltage control signals CT1 and CT2 of a high level are generated. During the period "A", the absolute potentials of the gamma reference voltages GMAO1 to GMAO5 and GMAO6 to GMAO10 increase to GMA+α, as shown in FIGS. 3 and 9. During a period "B" between two successive data voltages of the same polarity, logic levels of the first and second gamma voltage control signals CT1 and CT2 are inverted to a low logic level as shown in FIGS. 3 and 8. During the period "B" ranging from the supply of a previous data voltage to before a data voltage of the same polarity as the previous data voltage is supplied to the data lines D1 to Dm, the absolute potentials of the gamma reference voltages GMAO1 to GMAO5 and GMAO6 to GMAO10 decreases to GMA-α during a period corresponding to a low logic period of the second gamma voltage control signal CT2, as shown in FIGS. 3 and 9. During a period "C" when the positive/negative data voltage charged to the liquid crystal cells is holded, logic levels of the first and second gamma voltage control signals CT1 and CT2 are opposite to each other. During the period "C", the absolute potentials of the gamma reference voltages GMAO1 to GMAO5 and GMAO6 to GMAO10 are kept at the GMA voltage equal to the existing voltage, as shown in FIGS. 3 and 9. Accordingly, during the period "A", an absolute potential of the positive/negative data voltage output from the source driver IC increases to a potential greater than a normal potential. On the other hand, during the period "B", an absolute potential of the positive/negative data voltage output from the source driver IC decreases to a potential less than the normal potential. During the period "C" when the positive/negative data voltage charged to the liquid crystal cells is holded, the positive/negative data voltage is generated at a normal gamma compensation voltage potential. A pulse width of the first gamma voltage control signal CT1 and a low logic period of the second gamma voltage control signal CT2 have to be adjusted, so that charge amounts of successively generated data voltages of the same polarity are equal to each other. The periods "A", "B", and "C" correspond to a horizontal blanking period during which there is no video data.

Figure 10:
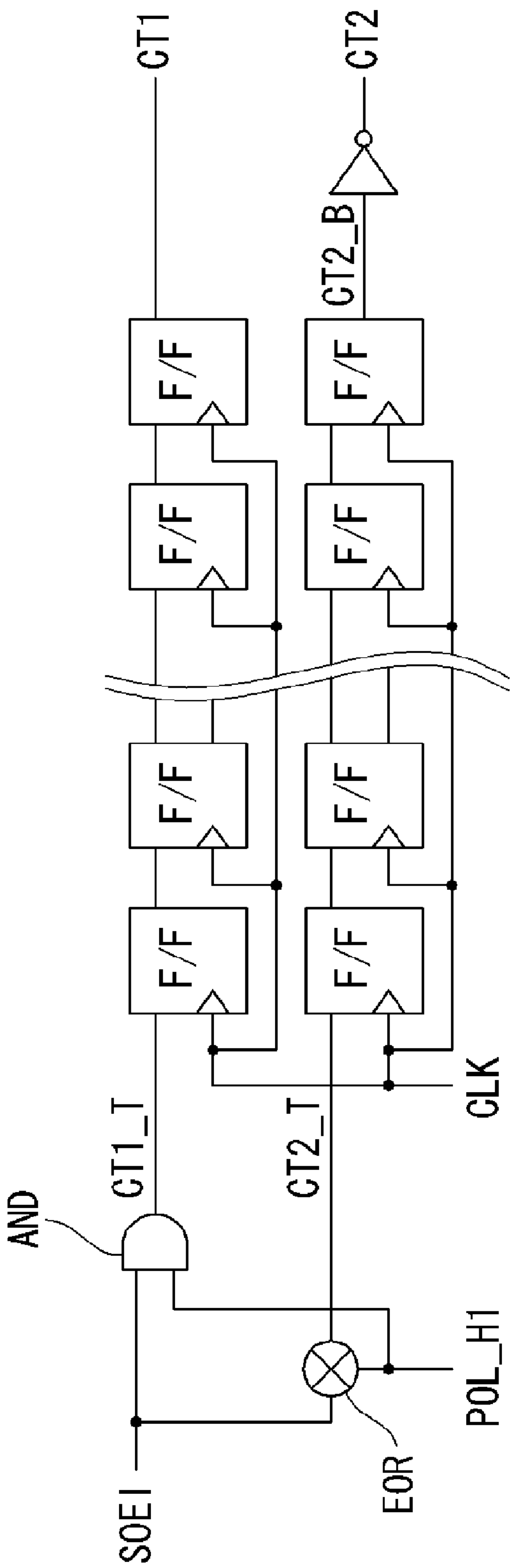
FIG. 10 is a circuit diagram illustrating a circuit configuration of a gamma voltage control circuit.

FIG. 10 is a circuit diagram illustrating a circuit configuration of the gamma voltage control circuit 16. FIG. 11 is a waveform diagram illustrating input and output waveforms of the gamma voltage control circuit 16.

As shown in FIG. 10, the gamma voltage control circuit 16 includes an exclusive OR (EOR) gate, an AND gate, and a plurality of D flip-flops F/F cascade-connected to an output terminal of each of the EOR gate and the AND gate.

The EOR gate generates an output signal CT2_T of a high logic level when logic levels of the internal polarity control signal POL_H1 and the internal source output enable signal SOEI are different from each other, otherwise the EOR gate generates the output signal CT2_T of a low logic level to thereby perform an exclusive OR operation. The AND gate generates an output signal CT1_T of a high logic level when logic levels of the internal polarity control signal POL_H1 and the internal source output enable signal SOEI are a high logic level, otherwise the AND gate generates the output signal CT1_T of a low logic level to thereby perform an AND operation. The D flip-flops F/F sequentially generate an output in response to the dot clock CLK to thereby delay the output CT1_T of the AND gate and the output CT2_T of the EOR gate. Accordingly, the first and second gamma voltage control signals CT1 and CT2 are delayed by a predetermined time from the output signals CT1_T and CT2_T. The delay time may vary depending on the number of D flip-flops F/F.

Figure 13:
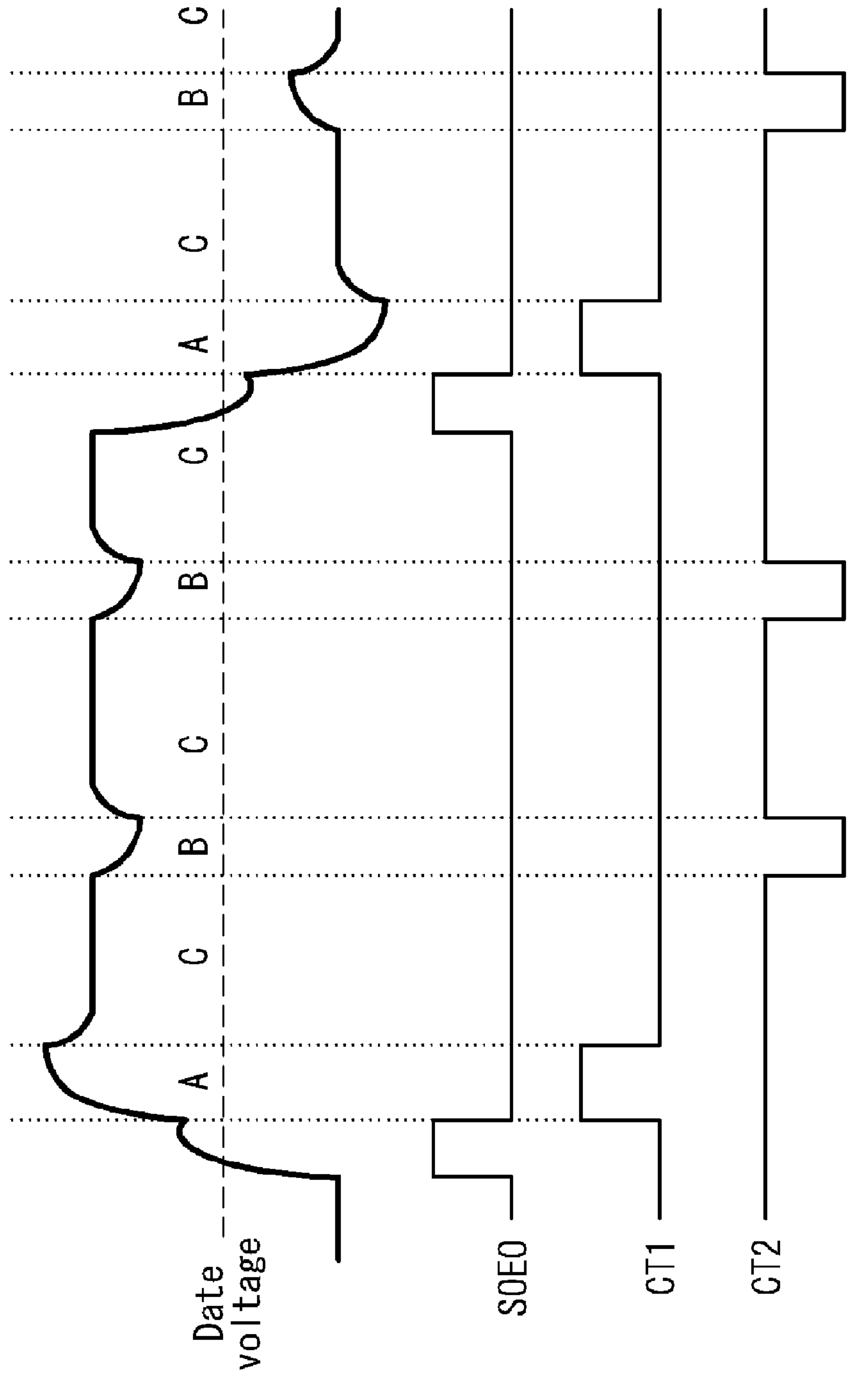
FIG. 13 is a waveform diagram illustrating a data voltage charged to liquid crystal cells when a 3-dot inversion is applied to a liquid crystal display device according to an embodiment of the invention.

When 3-dot inversion is applied to the liquid crystal display device according to the embodiment of the invention, the first and second gamma voltage control signals CT1 and CT2 may be adjusted as illustrated in FIG. 13 by adjusting the internal polarity control signal POL_H1 and the internal source output enable signal SOEI.

Figure 12:
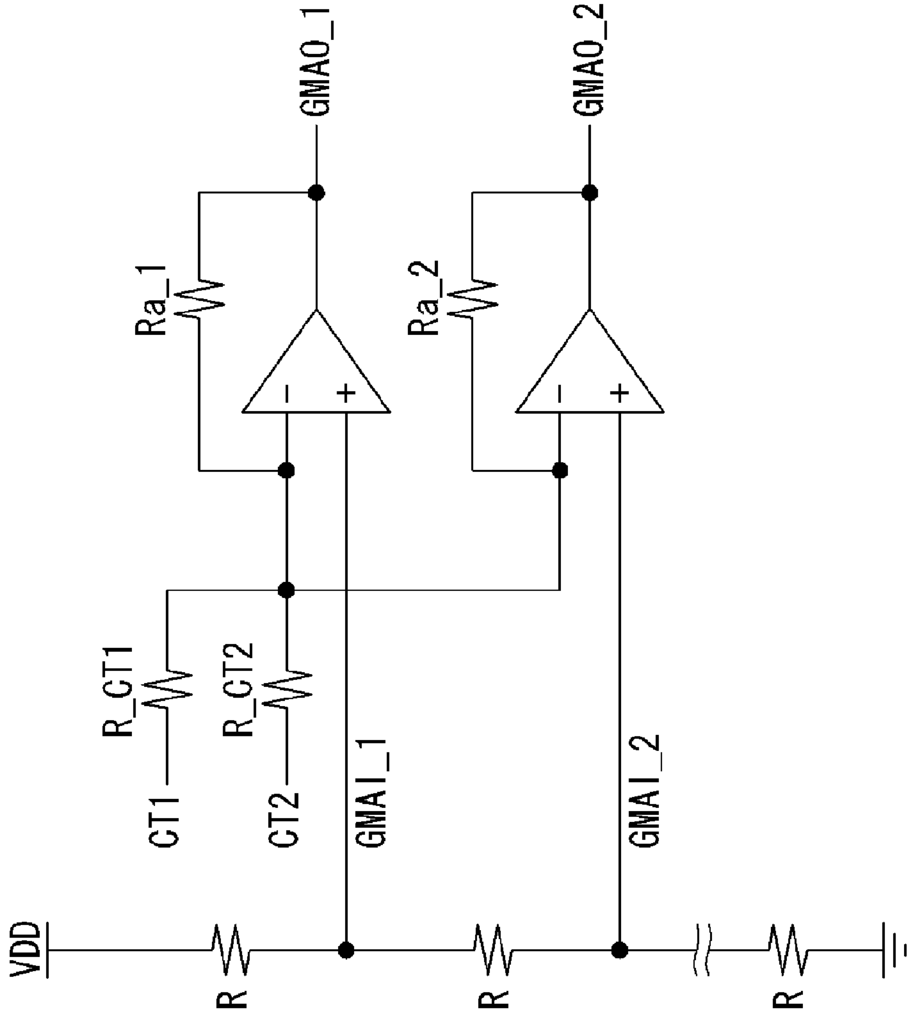
FIG. 12 is a circuit diagram illustrating a circuit configuration of a gamma voltage adjusting circuit.

FIG. 12 is a circuit diagram illustrating a circuit configuration of the gamma voltage adjusting circuit 17.

As shown in FIG. 12, the gamma voltage adjusting circuit 17 includes a plurality of operational amplifiers (OP amps) to which the internal positive and negative gamma reference voltages GMAI1 to GMAI5 and GMAI6 to GMAI10 are input, resistors R_CT1 and R_CT2 connected between an output terminal of the gamma voltage control circuit 16 and an inversion input terminal (−) of each of the OP amps, and resistors Ra_1 and Ra_2 connected between the inversion input terminal (−) and an output terminal of each of the OP amps.

Non-inversion input terminals (+) of the OP amps are connected to output terminals of a voltage division circuit of the gamma voltage generating circuit 15. Accordingly, the internal positive and negative gamma reference voltages GMAI1 to GMAI5 and GMAI6 to GMAI10 are input to the non-inversion input terminal (+) of each of the OP amps. The absolute potentials of the positive and negative gamma reference voltages GMAO1 to GMAO5 and GMAO6 to GMAO10 output from the OP amps may be raised or lowered depending on the first and second gamma voltage control signals CT1 and CT2 as indicated by the following Equation 1.

$$GMAO\_N = GMAI\_N \times \left[ \begin{array}{c} 1 + \left( CT1 \times \frac{Ra\_N}{R\_CT1} \right) + \\ \left( CT2 \times \frac{Ra\_N}{R\_CT1} \right) \end{array} \right] \quad \text{[Equation 1]}$$

In the above Equation 1, N indicates the number of taps of each of the gamma reference voltages, where N is 1, 2, . . . , N.

In the embodiment, the charge amounts of the data voltages can be uniformized in the N-dot inversion by raising the potentials of the gamma reference voltages GMAO1 to GMAO5 and GMAO6 to GMAO10 during the period "A"

when the polarity of the data voltage is inverted and lowering the potentials of the gamma reference voltages GMAO1 to GMAO5 and GMAO6 to GMAO10 during the period "B" between the data voltages of the same polarity. In the embodiment, other methods may be used. For example, the charge amounts of the data voltages can be uniformized in the N-dot inversion by raising the potentials of the gamma reference voltages GMAO1 to GMAO5 and GMAO6 to GMAO10 during the period "A" without lowering the potentials of the gamma reference voltages GMAO1 to GMAO5 and GMAO6 to GMAO10 during the period "B". As described above, each of the periods "A" and "B" may be adjusted depending on the first and second gamma voltage control signals CT1 and CT2.

As described above, in the liquid crystal display device and the method of driving the same according to the embodiment of the invention, the charge amounts of the data voltages can be uniformized in the N-dot inversion by raising the potentials of the gamma reference voltages during the period "A" when the polarity of the data voltage is inverted. Hence, the luminance and the contrast ratio can increase, and the display quality can be improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:

a liquid crystal display panel comprising:

data lines;

gate lines crossing the data lines; and liquid crystal cells arranged in a matrix format at each of crossings of the data lines and the gate lines;

a data drive circuit configured to convert digital video data into a positive/negative data voltage using gamma reference voltages to supply the positive/negative data voltage to the data lines; and a gamma voltage adjusting unit configured to:

increase the potentials of the gamma reference voltages during a first horizontal blanking period when a polarity of a data voltage is inversed, a horizontal blanking period being a period between the application of successive data voltages to a pixel;

supply a data voltage based on the increased gamma reference voltages during the first horizontal blanking period;

supply a normal data voltage based on a normal gamma reference voltages during a normal period subsequent to the first horizontal blanking period;

decrease the potentials of the gamma reference voltages during a second horizontal blanking period between the successively generated data voltages of the same polarity;

supply a data voltage based on the decreased gamma reference voltages during the second horizontal blanking period; and supply a normal data voltage based on a normal gamma reference voltages during a normal period subsequent to the second horizontal blanking period.

2. The liquid crystal display device of claim 1, further comprising:

a gate drive circuit configured to supply a gate pulse to the gate lines; and a timing controller configured to:

supply the digital video data to the data drive circuit; and control the data drive circuit, the gate drive circuit, and the gamma voltage adjusting unit.

3. The liquid crystal display device of claim 2, wherein the gamma voltage adjusting unit comprises:

a gamma voltage generating circuit configured to generate a normal gamma reference voltages;

a gamma voltage control circuit configured to output first and second gamma voltage control signals under the control of the timing controller; and a gamma voltage adjusting circuit configured to adjust an absolute potential of each of the normal gamma reference voltages in response to the first and second gamma voltage control signals to generate the gamma reference voltages to be supplied to the data drive circuit.

4. The liquid crystal display device of claim 3, wherein:

the timing controller supplies a first internal signal, comprising a logic level inverted every about 1 horizontal period, and a second internal signal, including pulses generated every about 1 horizontal period, to the gamma voltage control circuit; and the first internal signal and the second internal signal have a phase difference corresponding to a predetermined time interval.

5. The liquid crystal display device of claim 4, wherein the gamma voltage control circuit comprises:

an AND gate configured to generate an AND output of the first and second internal signals;

an exclusive OR (EOR) gate configured to generate an exclusive OR output of the first and second internal signals; and a plurality of flip-flops configured to delay the AND output of the AND gate and the exclusive OR output of the EOR gate to output the first and second gamma voltage control signals.

6. The liquid crystal display device of claim 5, wherein the gamma voltage adjusting circuit further comprises a plurality of operational amplifiers configured to selectively adjust the absolute potential of each of the normal gamma reference voltages according to the first and second gamma voltage control signals.

7. A method of driving a liquid crystal display device, the method comprising:

converting digital video data into a positive/negative data voltage using gamma reference voltages to supply the positive/negative data voltage to data lines of a liquid crystal display panel;

increasing the potentials of the gamma reference voltages during a first horizontal blanking period when a polarity of a data voltage is inversed, a horizontal blanking period being a period between the application of successive data voltages to a pixel;

supplying a data voltage based on the increased gamma reference voltages during the first horizontal blanking period;

supplying a normal data voltage based on a normal gamma reference voltages during a normal period subsequent to the first horizontal blanking period and, decreasing the potentials of the gamma reference voltages during a second horizontal blanking period between the successively generated data voltages of the same polarity;

supplying a data voltage based on the decreased gamma reference voltages during the second horizontal blanking period; and supplying a normal data voltage based on a normal gamma reference voltages during a normal period subsequent to the second horizontal blanking period.

8. The method of claim 7, wherein each of the increasing of the potential of each of the gamma reference voltages and the reducing of the potential of each of the gamma reference voltages comprises:

generating normal gamma reference voltages;

generating first and second gamma voltage control signals; and adjusting an absolute potential of each of the normal gamma reference voltages in response to the first and second gamma voltage control signals.

9. The method of claim 8, wherein the generating of the first and second gamma voltage control signals comprises generating a first internal signal, comprising a logic level inverted every about 1 horizontal period, and a second internal signal comprising pulses generated every about 1 horizontal period, the first internal signal and the second internal signal having a phase difference corresponding to a predetermined time interval.

10. The method of claim 9, wherein the generating of the first and second gamma voltage control signals further comprises:

generating an AND output of the first and second internal signals;

generating an exclusive OR output of the first and second internal signals; and delaying the AND output and the exclusive OR output to output the first and second gamma voltage control signals.

* * * * *